United States Patent [19]
Aoshima et al.

[11] Patent Number: 6,069,474
[45] Date of Patent: May 30, 2000

[54] LOAD SENSING DEVICE WITH LOAD DETECTION SIGNAL CORRECTION APPARATUS AND METHOD

[75] Inventors: Hideyuki Aoshima; Kathuji Suzuki, both of Shizuoka, Japan

[73] Assignee: Yazaki Corporation, Tokyo, Japan

[21] Appl. No.: 08/946,223

[22] Filed: Oct. 7, 1997

[30] Foreign Application Priority Data

Oct. 17, 1996 [JP] Japan ..................................... 8-274804

[51] Int. Cl.⁷ .............................. G01L 1/12; G01R 33/18; G01B 7/24
[52] U.S. Cl. ........................ 324/209; 324/225; 73/862.69
[58] Field of Search ................................... 324/209, 225, 324/239, 262; 73/779, 862.69

[56] References Cited

U.S. PATENT DOCUMENTS 3,903,739  9/1975  Kolavcic ............................... 73/862.69
4,843,316  6/1989  Hesterman ............................ 324/225

FOREIGN PATENT DOCUMENTS 24 42 313  3/1975  Germany .
8313332   11/1996  Japan .

*Primary Examiner*—Walter E. Snow
*Attorney, Agent, or Firm*—Sughrue, Mion, Zinn, Macpeak & Seas, PLLC

[57] ABSTRACT

A correction winding in which an alternating current flows attributable to magnetic flux generated in an exciting winding when an alternating current is allowed to flow in the exciting winding, is provided for a sensing device. In a state where the characteristics of the sensing device are not changed, electric power is supplied to the exciting winding so that a reference value, which is a digital value of the difference in the potential between the two ends of the correction winding detected by the correction detection circuit, is stored in a RAM of a microcomputer by operating a setting switch, and then divided with a digital value of the difference in the potential between the two ends of the correction winding detected by the correction detection circuit. A value Vso/Vs, which is a result of the division, is used to multiply the digital value of the difference in the potential between the two ends of the detection winding detected by the detection circuit.

9 Claims, 9 Drawing Sheets

LOAD SENSING DEVICE WITH LOAD DETECTION SIGNAL CORRECTION APPARATUS AND METHOD

BACKGROUND OF THE INVENTION

The present invention relates to a sensing device of a strain gauge type for measuring a load on, for example, a truck, a method of correcting an output from the sensing device, and an apparatus therefor.

In recent years, there arises a problem that a vehicle or the like having a load superimposed thereon has a traffic accident, such as rolling over, and the vehicle and the road are excessively damaged.

As one of the causes of the above-mentioned problem, an overload has been considered. To prevent the overload, the load on a vehicle, that is, a load superimposed on the vehicle has been measured.

Hitherto, a load on a vehicle has been measured such that a vehicle, the load of which is required to be measured, is placed on a platform scale. However, a large scale facility must be provided, which requires a large area, thus resulting in a limited number of the platform scales permitted to be provided. Therefore, a large number of vehicles cannot be measured and the cost of installation cannot be reduced.

Accordingly, a load measuring apparatus mounted on a vehicle and capable of measuring the load has been provided in recent years.

For example, in Japanese Patent Application No. Hei. 7-124860, as shown in the FIG. 9 perspective view, attention is paid to the fact that a shackle 134 is disposed between an end of a leaf spring 131 connected to a frame 132 of a bed through a forked bracket 133 and another bracket 133 connected to the frame 132. Then, a sensing device of a strain gauge type, for example, a strain gauge sensor for measuring a load is disposed in a shackle pin 5 for movably connecting the shackle 134 to the bracket 133. The load is calculated in accordance with the total amount of measured values of a plurality of sensing devices corresponding to respective wheels.

FIG. 10 is a cross sectional view showing positions of sensing devices in the shackle pin. The shackle pin 5 has, at the two ends in the axial direction thereof, accommodating spaces 5a and 5b. The accommodating spaces 5a and 5b communicate with each other through a through hole 5c in the shackle pin 5.

The accommodating space 5a of the shackle pin 5 accommodates a sensing device 7A accommodated in a first case assembly 9 in such a manner that the first case assembly 9 is accommodated. The accommodating space 5b of the shackle pin 5 accommodates a sensing device 7A accommodated in a second case assembly 11 in such a manner that the second case assembly 11 is accommodated.

The conventional sensing devices 7A respectively accommodated in the two accommodating spaces 5a and 5b of the shackle pin 5, shown in FIG. 11 as a perspective view, comprise a plate-like member 7a and a coil 7g serving as a sensing section.

The plate-like member 7a is made of a magnetic material, such as permalloy, formed into a substantially rectangular shape and comprises a coil portion 7b a substantially central portion in the lengthwise direction and fixed portions 7c on both sides of the coil portion 7b.

Four cut portions 7e each having a semicircular shape for relaxing stress acting on the plate-like member 7a are formed at the boundaries between the coil portion 7b and the two fixed portions 7c in the two end surfaces in the widthwise direction of the plate-like member 7a. The coil portion 7b inside the four cut portions 7e has four through holes 7f respectively formed apart from one another in the lengthwise direction and the widthwise direction.

The coil 7g has an exciting winding 7h and a detecting winding 7j forming a cross coil, and the windings 7h and 7j are covered with an insulating material (not shown), such as enamel.

The detecting winding 7j is wound between the two through holes 7f opposite to each other in the lengthwise direction. The two ends of the detecting winding 7j are extracted through the through holes 7f. The exciting winding 7h is wound between the two through holes 7f opposite to each other in the widthwise direction. The two ends of the exciting winding 7h are extracted through the through holes 7f.

The sensing devices 7A having the above-mentioned structure are, in a state where they are accommodated in the first case assembly 9 and the second case assembly 11, usually disposed in the accommodating spaces 5a and 5b of the shackle pin 5 in such a way that, as shown in FIG. 10, the lengthwise direction of the plate-like member 7a coincides with the axial direction of the shackle pin 5 which extends in the widthwise direction B of the vehicle and the widthwise direction of the plate-like member 7a coincides with the direction A of the height of the vehicle. Moreover, one of the fixed portions 7c is received by the bracket 133, while the other of the fixed portions 7c is received by the shackle 134.

In the above-mentioned state, both of the direction of the axis winding of the detecting winding 7j wound between the two through holes 7f in the lengthwise direction of the plate-like member 7a and the direction of the axis of winding of the exciting winding 7h wound between the two through holes 7f opposite to each other in the widthwise direction of the plate-like member 7a are made to be a direction of a plane including the lengthwise and widthwise directions of the plate-like member 7a, that is, a direction of a plane along the direction A of the height and direction B of the width of the vehicle.

When an electric current is allowed to flow between the two ends of the exciting winding 7h of the sensing device 7A, a magnetic field is generated in the plate-like member 7a so that an induced current flows between the two ends of the detecting winding 7j.

When a load is applied from the frame 132 to the plate-like member 7a through the bracket 133, the shackle 134, and the two ends of the shackle pin 5, so that, the bracket 133 is relatively moved in the direction A of the height of the vehicle with respect to the shackle 134 and the plate-like member 7a is also distorted in the direction A, the direction of the magnetic field in the sensing device 7A is changed. As a result, the induced current, which flows between the two ends of the detecting winding 7j, is changed.

As a result, an electric current, the level of which corresponds to the load applied to the sensing device 7A, can be obtained from the two ends of the detecting winding 7j as an output signal.

However, if the ambient temperature is changed or the sensing device 7A deteriorates with age, the output characteristic of the above-mentioned conventional sensing device 7A is changed. As a result, the level of the induced current, which flows between the two ends of the detecting winding 7j when a load is applied, is undesirably changed even if the level of the electric current, which is supplied to the exciting winding 7h, is kept constant. Therefore, there arises a problem that an accurate load cannot be calculated in accordance with the output from the sensing device 7A.

It might therefore be considered to employ a temperature compensating method having the steps of detecting the ambient temperature by using, for example, a temperature sensor, and correcting the level of the induced current, which flows between the two ends of the detecting winding 7j, to correspond to the change in the temperature. However, change in the characteristic of the sensing device 7A attributable to deterioration with age cannot be compensated.

SUMMARY OF THE INVENTION

In view of the foregoing, an object of the present invention is to provide a sensing device of a strain gauge type for measuring a load of a truck or the like, which is capable of coping with not only the change in the ambient temperature but also the aging change of the sensing device itself, and is suitably used in correcting the output which has been distorted because of change in the properties of the sensing device. It is a further object to provide an output correction method using the sensing device and an output correction apparatus for the sensing device capable of embodying the method.

A sensing device according to a first aspect of the present invention comprises an exciting winding wound around a magnetic core made of a magnetic material, and supplied with electric power so that, a detecting winding wound around the magnetic core, intersecting the exciting winding generates a detection signal having a level corresponding to a load applied to the magnetic core, and is characterized in that a correction winding wound around the magnetic core in the same direction as a direction in which the exciting winding is wound around the magnetic core, is provided.

A method of correcting an output from a sensing device according to a second aspect of the present invention involves correcting the level of the detection signal to correspond to change in the characteristics of the sensing device of the first aspect, and comprises the steps of: using as a reference value, the level of a correction signal which is generated in the correction winding owing to magnetic flux which is generated when electric power is supplied to the exciting winding in a reference characteristic state of the sensing device; and correcting the level of the detection signal in accordance with the ratio of the reference value and an actual level of the correction signal.

A method of correcting an output from a sensing device according to a third aspect of the present invention that corrects the level of the detection signal to correspond to change in the characteristics of the sensing device of the first aspect, comprises the steps of: using, as a reference value, the level of a correction signal which is generated in the correction winding owing to magnetic flux which is generated when electric power is supplied to the exciting winding in a reference characteristic state of the sensing device; and changing the level of an electric current which is supplied to the exciting winding in accordance with the ratio of the reference value and the actual level of the correction signal.

An apparatus for correcting an output from a sensing device according to a fourth aspect of the present invention, is an apparatus arranged such that the level of the detection signal is corrected in accordance with change in the characteristics of the sensing device of the first aspect, and comprises: detection signal level detection means for detecting the level of the detection signal; correction signal level detection means for correcting the level of a correction signal generated in the correction winding owing to the magnetic flux generated when electric power is supplied to the exciting winding; reference value storage means for storing the reference value of the correction signal corresponding to the level of the electric current supplied to the exciting winding; and detection signal level correction means for correcting the level of the detection signal detected by the detection signal level detection means, wherein the detection signal level correction means corrects the level of the detection signal detected by the detection signal level detection means in accordance with the ratio of the level of the correction signal detected by the correction signal level detection means and the reference value stored by the reference value storage means.

An apparatus for correcting an output from a sensing device of the first aspect of the present invention, is an apparatus arranged such that the level of the detection signal is corrected in accordance with change in the characteristics of the sensing device of the first aspect, and comprises: detection signal level detection means for detecting the level of the detection signal; correction signal level detection means for correcting the level of a correction signal which is generated in the correction winding due to the magnetic flux generated when electric power is supplied to the exciting winding; reference value storage means for storing the reference value of the correction signal corresponding to the level of the electric current supplied to the exciting winding; and exciting current changing means for changing the level of the electric current which is supplied to the exciting winding, wherein the exciting current changing means changes the level of the electric current which is supplied to the exciting winding in accordance with the ratio of the level of the correction signal detected by the correction signal level detection means and the reference value stored by the reference value storage means.

An apparatus for correcting an output from a sensing device according to a sixth aspect of the present invention, further comprises reference value acquiring means for causing the reference value storage means to store, as the reference value, the level of the correction signal detected by the correction signal level detection means when the sensing device is initially operated.

The sensing device of the first aspect of the present invention is arranged such that magnetic flux generated adjacent to the exciting winding when electric power is supplied to the exciting winding causes a correction signal having a level corresponding to the level of the electric current, which flows in the exciting winding, to be generated in the correction winding. The level of the correction signal is changed in accordance with the ambient temperature of the sensing device and with the change in the characteristic of the sensing device attributable to deterioration of the sensing device with age.

Therefore, change in the level of the correction signal generated in the correction winding can be used to detect change in the characteristic of the sensing device and the degree of the change.

The output correction method for the sensing device according to the second aspect of the present invention is arranged in such a way that the ratio of the reference value of the correction signal and the actual level corresponds to the ratio of change of the level of the actual detection signal from the original level of the detection signal in a reference characteristic state of the sensing device attributable to change in the characteristic of the sensing device. Therefore, correction of the actual level of the detection signal in accordance with the ratio of the reference value of the correction signal and the actual level enables the level of the detection signal to be restored to the original level to accurately calculate the load.

The foregoing fact is applied to the output correction apparatus for the sensing device of the fourth aspect of the present invention.

The output correction method for the sensing device of the third aspect of the present invention is arranged such that the level of the electric current, which is supplied to the exciting winding, is changed in accordance with the ratio of the reference value of the correction signal and the actual level so that the actual level of the correction signal is changed by a degree corresponding to the rate of the change in the detection signal from the original level in the reference characteristic state for the sensing device. Therefore, the level of the detection signal can be restored to the original level and thus an accurate load can be calculated.

The foregoing fact is applied to the output correction apparatus for the sensing device of the fifth aspect of the present invention.

The output correction apparatus for the sensing device of the sixth aspect of the present invention is arranged such that the reference value stored by the reference value storage means is acquired by the reference value acquiring means. Thus, the necessity of causing the reference value storage means to previously store the reference value can be eliminated. Thus, the reference value can automatically be stored by the reference value storage means.

DETAILED DESCRIPTION OF THE INVENTION

A sensing device and an output correction method for the sensing device, as well as an output correction apparatus, according to the present invention will now be described with reference to the drawings.

Figures 1A, 1B:
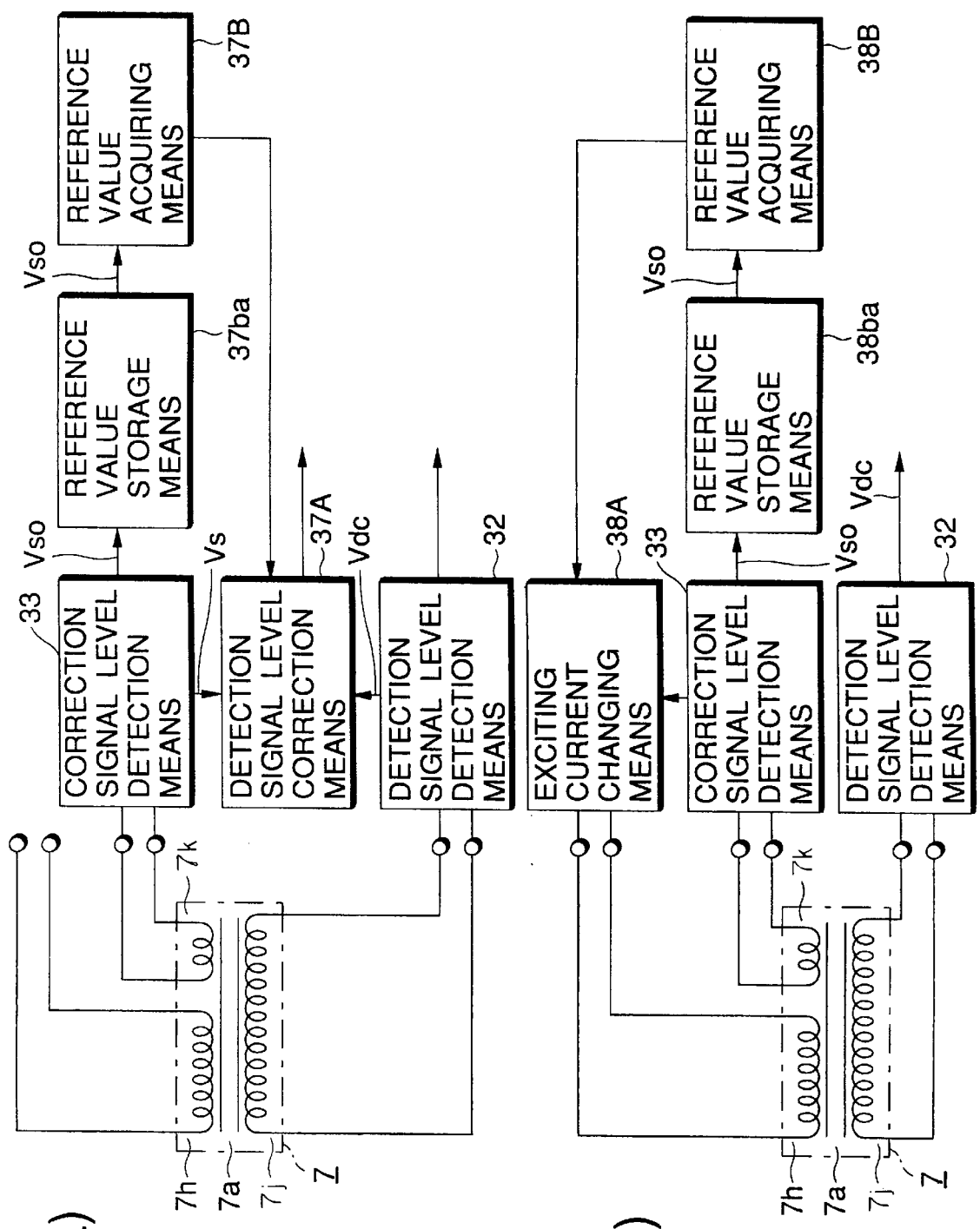
FIGS. 1(a) and 1(b) are basic structural views showing an output correction apparatus for a sensing device according to the present invention.
Figure 2:
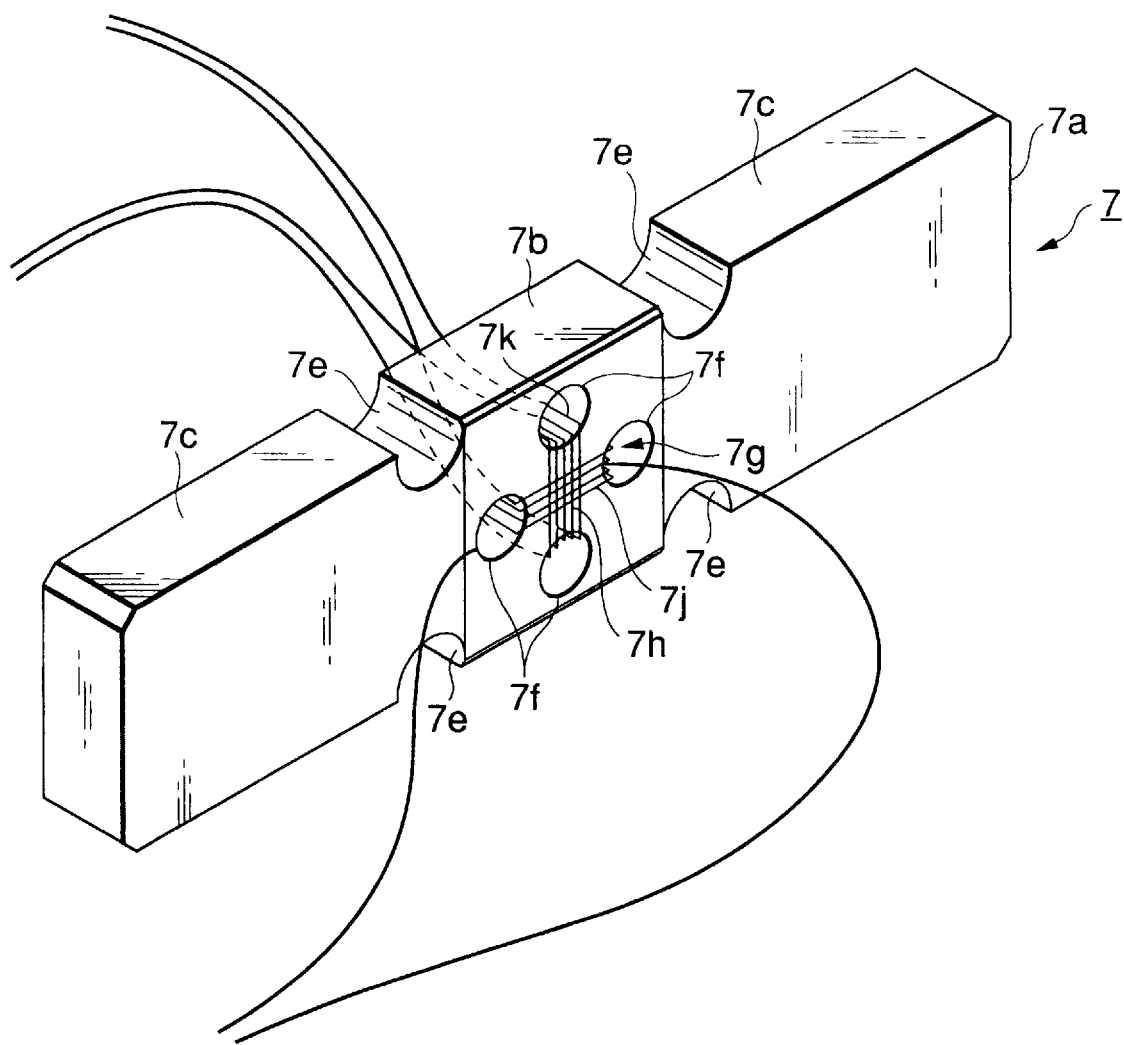
FIG. 2 is a perspective view showing a sensing device commonly employed in the first and second embodiments of the present invention.
Figure 11:
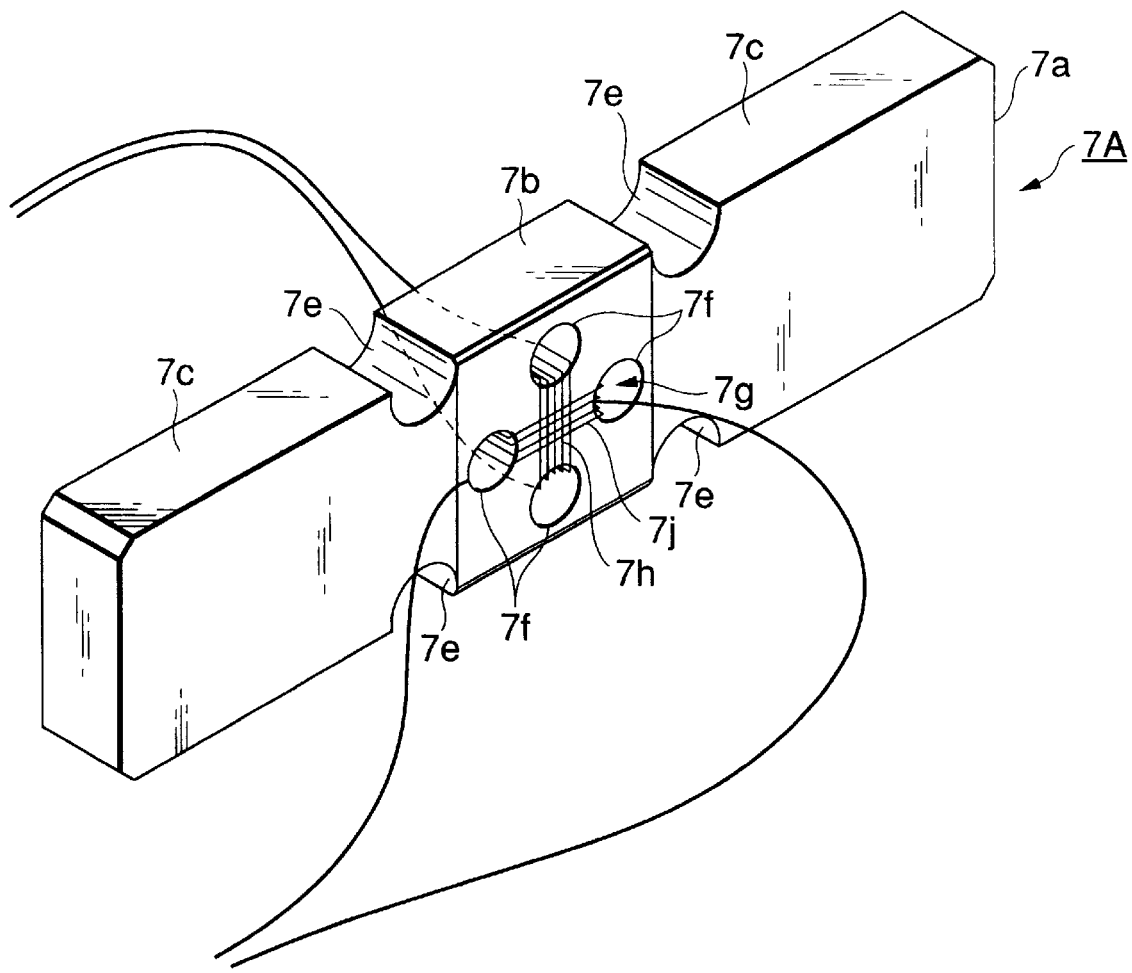
FIG. 11 is a perspective view showing a conventional sensing device shown in FIG. 10.

FIG. 2 is a perspective view showing the sensing device commonly employed according to first and second embodiments of the present invention. Similar portions and elements showing in the drawings to those described in the prior art are given the same reference numerals as those shown in FIG. 11.

The sensing device 7, as shown in FIG. 2 and according to the first and second embodiments, comprises a correction winding 7k similar to the exciting winding 7h and wound between two through holes 7f opposite to each other in the widthwise direction of the plate-like member 7a (corresponding to the magnetic core). The two ends of the correction winding 7k are extracted through the through holes 7f, and the correction winding 7k is covered with an insulating member (not shown), such as enamel.

Figure 3:
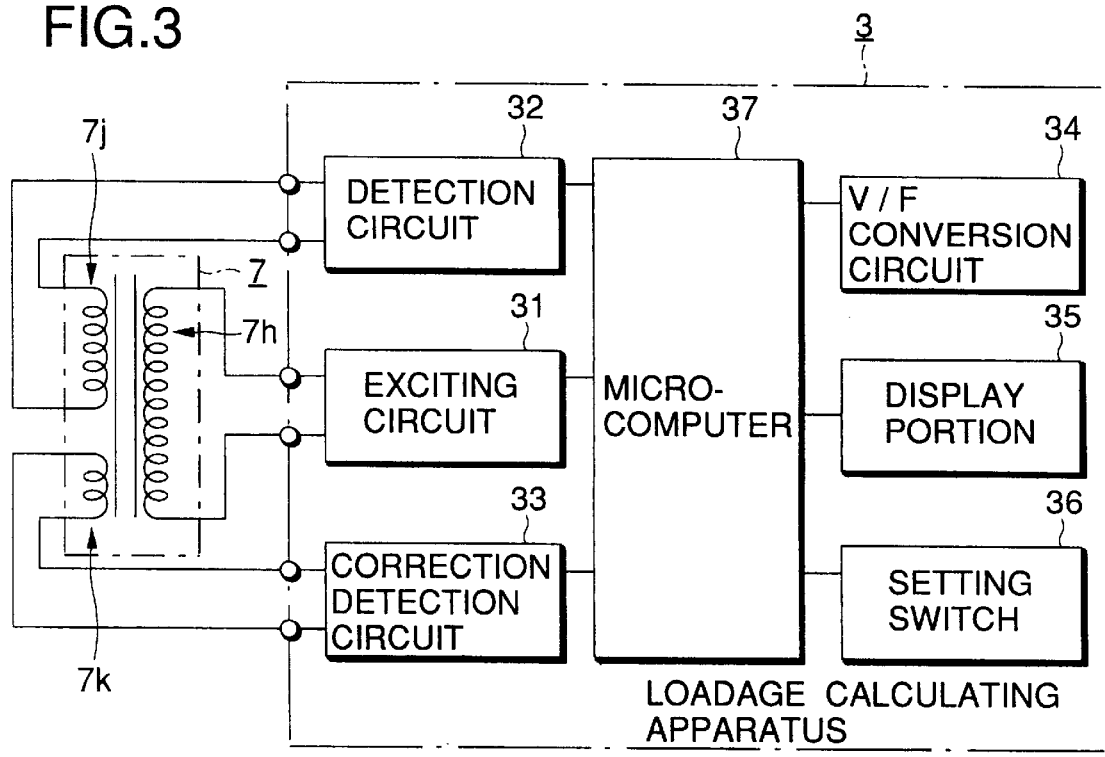
FIG. 3 is an explanatory view showing the schematic structure of a load calculating unit to which the sensing device shown in FIG. 2 is connected and structured to include an output correction apparatus according to the first embodiment of the present invention.

The schematic structure of a load calculating unit which is structured to include the output correction apparatus according to the first embodiment and to which the sensing device shown in FIG. 2 is connected will now be described with reference to FIG. 3 which is an explanatory view.

A load calculating unit 3 comprises an exciting circuit 31, a detection circuit 32, a correction detection circuit 33, a V/F conversion circuit 34, a display unit 35, a setting switch 36 and a microcomputer 37.

The exciting circuit 31 generates an alternating signal. Two ends of the exciting winding 7h of the sensing device 7 are connected to the exciting circuit 31.

The detection circuit 32 (corresponding to the detection signal level detection means) detects the difference in the potential between the two ends of the detection winding 7j of the sensing device 7. The two ends of the detection winding 7j are connected to the detection circuit 32. In this embodiment, the difference in the potential between the two ends of the detection winding 7j corresponds to the level of the detection signal recited in the claims.

The correction detection circuit 33 (corresponding to the correction signal level detection means) detects the difference in the potential between the two ends of the correction winding 7k of the sensing device 7. The two ends of the correction winding 7k are connected to the correction detection circuit 33. In this embodiment, the difference in the potential between the two ends of the correction winding 7k corresponds to the level of the correction signal recited in the claims.

The V/F conversion circuit 34 performs voltage-to-frequency conversion such that the difference in the potential between the two ends of the detection winding 7j is corrected by the microcomputer 37 after the difference has been detected by the detection circuit 32.

The display unit 35 displays the load calculated by the microcomputer 37 in accordance with the difference in the potential between the two ends of the correction winding 7k detected by the correction detection circuit 33 and the frequency corresponding to the correction value of the difference in the potential between the two ends of the detection winding 7j output from the V/F conversion circuit 34. The display unit 35 is formed by disposing, for example, 7-segment, light emitting diodes by a number corresponding to required digits by using a liquid crystal display.

The setting switch 36 is operated to store, as a reference value, the level of the difference in the potential between the two ends of the correction winding 7k detected by the correction detection circuit 33 in a state where change in the characteristic of the sensing device 7 attributable to change in the temperature or deterioration with age does not take place.

Figure 4:
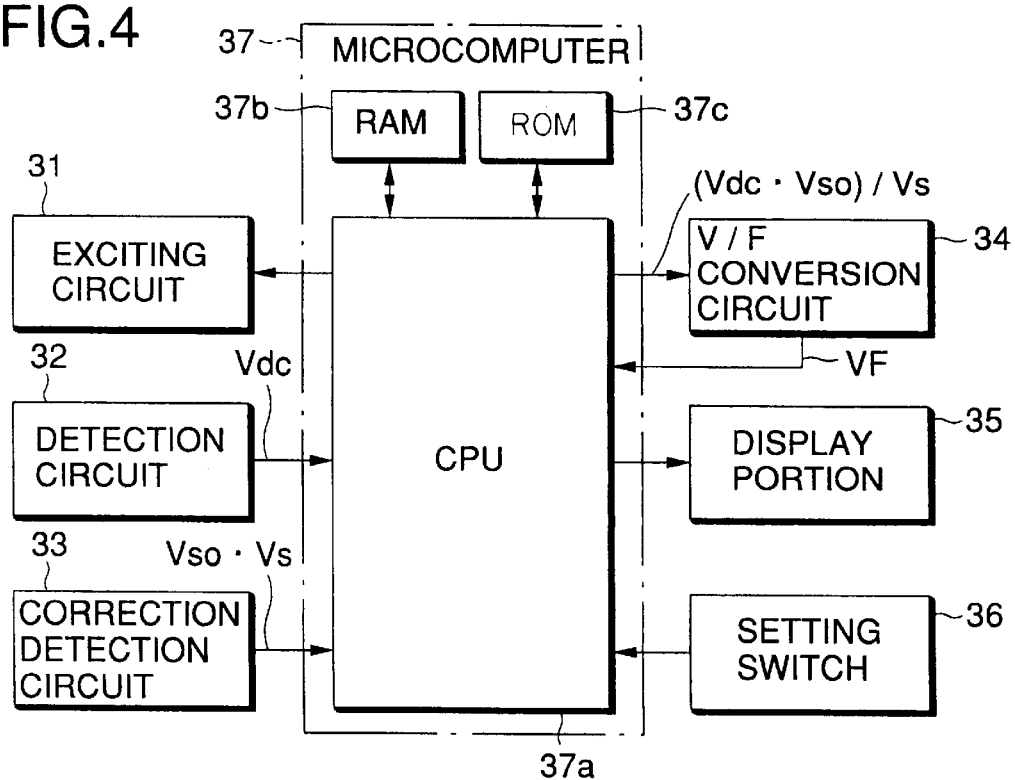
FIG. 4 is a block diagram showing the hardware structure of the microcomputer shown in FIG. 3.

The hardware structure of the microcomputer 37 will now be described with reference to FIG. 4, which is a block diagram.

The microcomputer 37 comprises a CPU (Central Processing Unit) 37a, a RAM (Random Access Memory) 37b and a ROM (Read-Only Memory) 37c.

The RAM 37b and the ROM 37c are connected to the CPU 37a. Moreover, the detection circuit 32 and the correction detection circuit 33 are connected to the CPU 37a through an A/D converter and an input interface (not shown). In addition, the setting switch 36 is connected to the CPU 37a through the input interface.

Moreover, the exciting circuit 31 and the V/F conversion circuit 34 are connected to the CPU 37a through an output interface and a D/A converter (not shown). In addition, the display unit 35 is connected to the CPU 37a through a driver (not shown).

The RAM 37b has a data area for storing a variety of data items and a work area for performing a variety of operations. The ROM 37c stores a control program for causing the CPU 37a to calculate the load and perform various processes including the displaying process.

The microcomputer 73 calculates the load on the vehicle provided with the sensing device 7 in accordance with the frequency corresponding to the difference in the potential between the two ends of the detection winding 7j of the sensing device 7 output from the V/F conversion circuit 34 and causes the display unit 35 to display the calculated load.

Among the processes which are performed by the CPU 37a in accordance with the control program stored in the ROM 37c, a process for correcting the difference in the potential between the two ends of the detection winding 7j in accordance with the change in the characteristic of the sensing device 7 will now be described with reference to a flow chart shown in FIG. 5.

When a power supply switch (not shown) is switched on, the load calculating unit 3 is supplied with electric power, the microcomputer 37 is turned on, and the program is started, the CPU 37a confirms whether or not reference-value set completion flag F in the work area in the RAM 37b is "1" (step S1). If the flag F is "1" (Y in step S1), the operation proceeds to step S11. If the flag F is not "1" (N in step S1), whether or not the setting switch 36 has been turned on is tested (step S3).

If the setting switch 36 has not been turned on (N in step S3), step S3 is repeated until switch 30 is operated. If the setting switch 36 has been operated (Y in step S3), the difference in the potential between the two ends of the correction winding 7k of the sensing device 7 detected by the correction detection circuit 33 is fetched after it has been converted into a digital value by the A/D converter (not shown) (step S5).

The digital value fetched in step S5 is stored in a reference value storage area of the work area of the RAM 37b as the difference in the potential between the two ends of the correction winding 7k in a state where the characteristic of the sensing device 7 has not been changed from the reference characteristic attributable to the change in the temperature and deterioration with age, that is, reference value Vso (step S7). Then, the reference-value setting completion flag F in the Ram 37b is set to "1" (step S9), and then the operation returns to step S1.

In step S11 to which the operation proceeds through (Y) in step S1 when the reference-value setting completion flag F is "1", whether or not a predetermined sampling period T has elapsed is determined. If it has not elapsed (N), step S11 is repeated until it elapses. If it has elapsed (Y), the difference in the potential between the two ends of the detection winding 7j of the sensing device 7 detected by the detection circuit 32 is converted into the digital value Vdc by the A/D converter (not shown), and then fetched (step S13). Moreover, the difference in the potential between the two ends of the correction winding 7k of the sensing device 7 detected by the correction detection circuit 33 is converted into the digital value Vs by the A/D converter (not shown), and then fetched (step S15).

Then, value Vso/Vs obtained by dividing the reference value Vso stored in the reference value storage area of the RAM 37b with the digital value Vs fetched in step S15 is multiplied with the digital value Vdc fetched in step S13 so that the digital value Vdc, which is the difference in the potential between the two ends of the detection winding 7j, is corrected to correspond to the change in the characteristic of the sensing device 7 (step S17). The corrected digital value Vdc is output to the V/F conversion circuit 34 (step S19), and then whether or not frequency Fdc, from the V/F-conversion of the corrected digital value Vdc, has been supplied from the V/F conversion circuit 34, is determined (step S21).

If the frequency Fdc has not been supplied (N in step S21), step S21 is repeated until it is supplied. If it has been supplied (Y in step S21), a load calculation and display process is performed such that a load is calculated in accordance with the supplied frequency Fdc and the load is displayed on the display unit 35 (step S23). Then, the operation returns to step S1.

Figure 5:
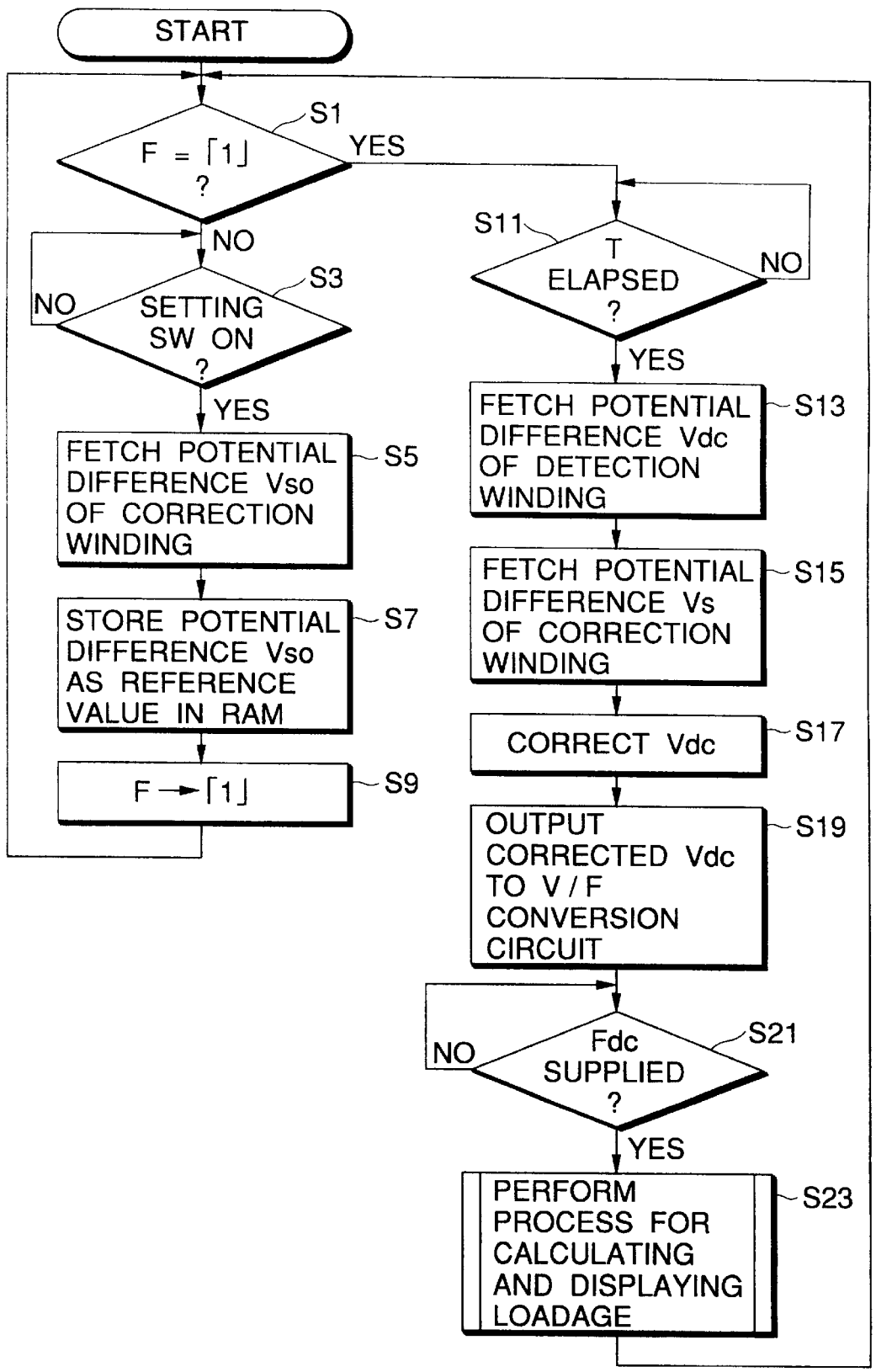
FIG. 5 is a flow chart showing a process for correcting the difference in the potential between the two ends of a detecting winding in accordance with the change in the characteristic of the sensing device among the processes which are performed by the CPU in accordance with a control program stored in the ROM of the microcomputer shown in FIG. 4.

As described above, the first embodiment has the structure in which the reference value storage means 37ba in the claims is formed by the reference value storage area in the work area of the RAM 37b of the microcomputer 37, the detection signal level correction means 37A is formed by step S17 in the flow chart shown in FIG. 5, and the reference value acquiring means 37B is formed by steps S5 and S7 shown in FIG. 5.

The operations of the sensing device 7 and the load calculating unit 3 according to the first embodiment having the above-mentioned structure will now be described.

When the power supply switch (not shown) has been switched on so that the load calculating unit 3 has been supplied with electric power, the exciting circuit 31 is turned on by the microcomputer 37 and an alternating current is supplied to the exciting winding 7h of the sensing device 7, and an induced current flows in the detection winding 7j. Moreover, magnetic flux generated in the exciting winding 7h causes an alternating current to flow also in the correction winding 7k.

Figure 10:
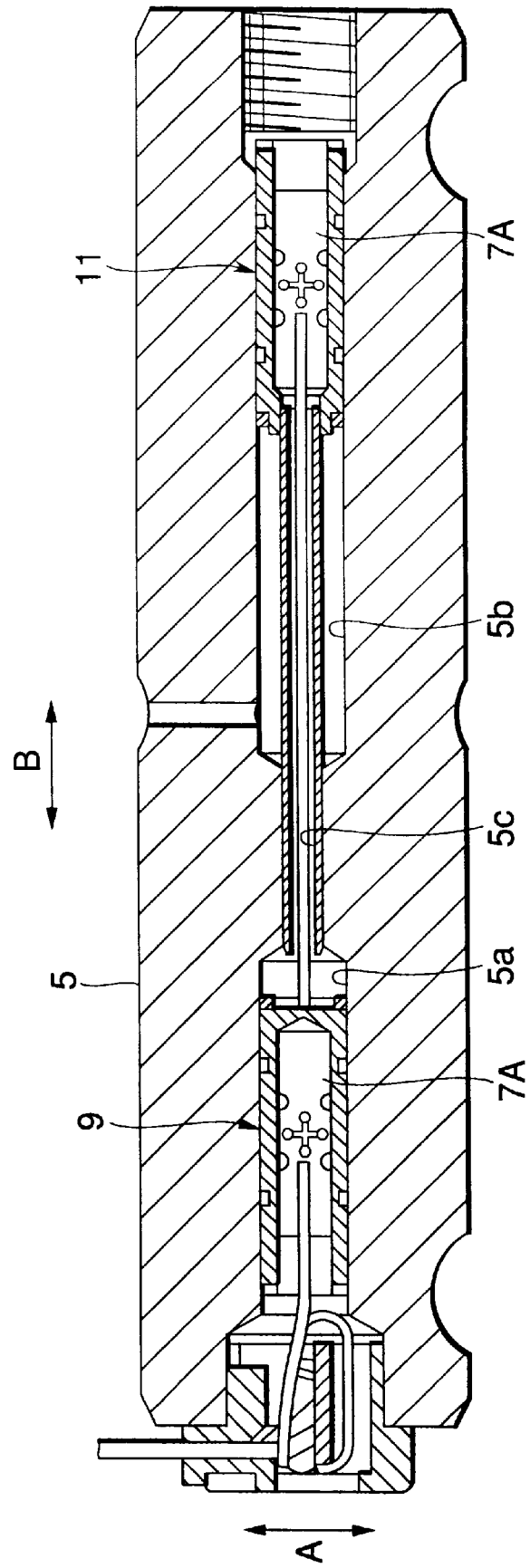
FIG. 10 is a cross sectional view showing the positions of the sensing devices in a shackle pin shown in FIG. 9.

The sensing device 7 is, similar to the conventional sensing device 7A shown in FIG. 10, disposed in the shackle pin 5 in such a manner that the widthwise direction of the plate-like member 7a is made to be the direction A (see FIG. 2) of the height of the vehicle and the lengthwise direction of 7a is made to be the widthwise direction B (see FIG. 2) of the vehicle. Moreover, the detection winding 7j is wound between the two through holes 7f of the plate-like member 7a opposite to each other in the lengthwise direction, and the axis of winding extends in the widthwise direction B of the vehicle. When a change in the load applied to the vehicle changes the degree of distortion of the plate-like member 7 along the direction A of the height of the vehicle, the direction of the magnetic flux in the plate-like member 7a is changed. When an alternating current is supplied to the exciting winding 7h, the alternating induced current which flows in the detection winding 7j is changed.

The alternating induced current, which flows in the 7j winding is also changed in a case where the characteristic of the sensing device 7 is changed due to change in the ambient temperature of the sensing device 7 and the vehicle, and the deterioration of the sensing device 7 with age in addition to the change in the load which is applied to the vehicle.

On the other hand, the correction winding 7k is wound between the trough holes 7f of the plate-like member 7a opposite to each other in the widthwise direction of the plate-like member 7a and the axis of winding extends in the direction A of the height of the vehicle. Therefore, the alternating current, which flows in the correction winding 7k, is not changed to correspond to change in the load which is applied to the vehicle. The alternating current, which flows in the correction winding 7k, is changed when the characteristic of the sensing device 7 is changed because of the change in the ambient temperature of the sensing device 7 and the vehicle, and the deterioration in the sensing device 7 with age.

Therefore, when the load calculating unit 3 and the sensing device 7 are initially used, the setting switch 36 is operated in a state where the ambient temperatures of the sensing device 7 and the vehicle provided with the sensing of device 7 are maintained to a level at which the characteristic of the sensing device 7 is not changed attributable to the temperature.

When an alternating current is allowed to flow in the exciting winding 7h, the difference in the potential between the two ends of the correction winding 7k, in which the alternating current flows, is detected by the correction detection circuit 33. A digital value of the detected difference in the potential between the two ends of the correction winding 7k is stored in the RAM 37b of the microcomputer 37 as the reference value Vso. The reference value Vso is continuously stored in the RAM 37b regardless of the switching operation of the power supply switch.

After the reference value Vso has been stored in the RAM 37b of the microcomputer 37, value Vso/Vs, obtained by dividing the reference value Vso with the digital value Vs of the difference in the potential between the two ends of the correction winding 7k detected by the correction detection circuit 33 and fetched by the microcomputer 37, is obtained as a correction value for compensating the change in the characteristic occurring due to both the temperature of the sensing device 7 and the deterioration of the same with age. The value Vso/Vs is multiplied with the digital value Vdc of the difference in the potential between the two ends of the detection winding 7j detected by the detection circuit 32 and fetched by the microcomputer 37. Thus, the digital value Vdc of the difference in the potential between the two ends of the detection winding 7j is corrected.

The digital value (Vdc·Vso)/Vs of the difference in the potential between the two ends of the detection winding 7j corrected with the value Vso/Vs, which is the correction value for compensating the change in the characteristic of the sensing device 7, is converted into frequency VF=α(Vdc·Vso)/Vs by multiplying conversion ratio α by the V/F conversion circuit 34 output. Then, the microcomputer 37 subtracts the frequency corresponding to offset from the foregoing frequency VF=α(Vdc·Vso)/Vs, and then implements a predetermined weight conversion equation or the like. Thus, the load can be calculated and displayed on the display unit 35.

During a period in which electric power is supplied to the load calculating unit 3, for example during a vehicle stop, the calculation of the load is repeated through the above-mentioned operation during every predetermined sampling period T. Thus, display on the display unit 35 is updated.

As described above, according to this embodiment, the correction winding 7k, similarly to the exciting winding 7h, is wound between the two through holes 7f. When an alternating current is supplied from the exciting circuit 31 to the exciting winding 7h, the correction winding 7k is also supplied with an alternating current, attributable to magnetic flux generated in the correction winding 7k.

This embodiment is structured such that the reference value Vso, which is a digital value of the difference in the potential between the two ends of the correction winding 7k detected by the correction detection circuit 33 when an alternating current is allowed to flow in the correction winding 7k in a state where the temperature is retained to a level at which the characteristic of the sensing device 7 is not changed attributable to the temperature and as well as in a state where the load calculating unit 3 and the sensing device 7 are initially used, is stored. Then, the stored value is divided by the digital value Vs of the difference in the potential between the two ends of the correction winding 7k detected by the correction detection circuit 33. The value Vso/Vs, which is the result of the division, is multiplied with the digital value Vdc of the difference in the potential between the two ends of the detection winding 7j detected by the detection circuit 32.

Therefore, even if the characteristic of the sensing device 7 is changed attributable to change in the ambient temperature of the sensing device 7 and of the vehicle, and to deterioration of the sensing device 7 with age, the degree of the change in the characteristic can be recognized in accordance with the degree of change in the difference in the potential between the two ends of the correction winding 7k. In accordance with the degree of the change in the difference in the potential between the two ends of the correction winding 7k, change in the difference in the potential between the two ends of the detection winding 7j occurring due to change in the characteristic of the sensing device 7 is corrected so that the difference in the potential between the two ends of the detection winding 7j is restored to the original value in a state where the characteristic of the sensing device 7 is not changed. As a result, an accurate load value can be calculated.

Next, the schematic structure of a load calculating unit, which is structured to include the output correction apparatus according to a second embodiment of the present invention and to which the sensing device shown in FIG. 2 is connected, will now be described with reference to FIG. 6 which is an explanatory view.

Figure 6:
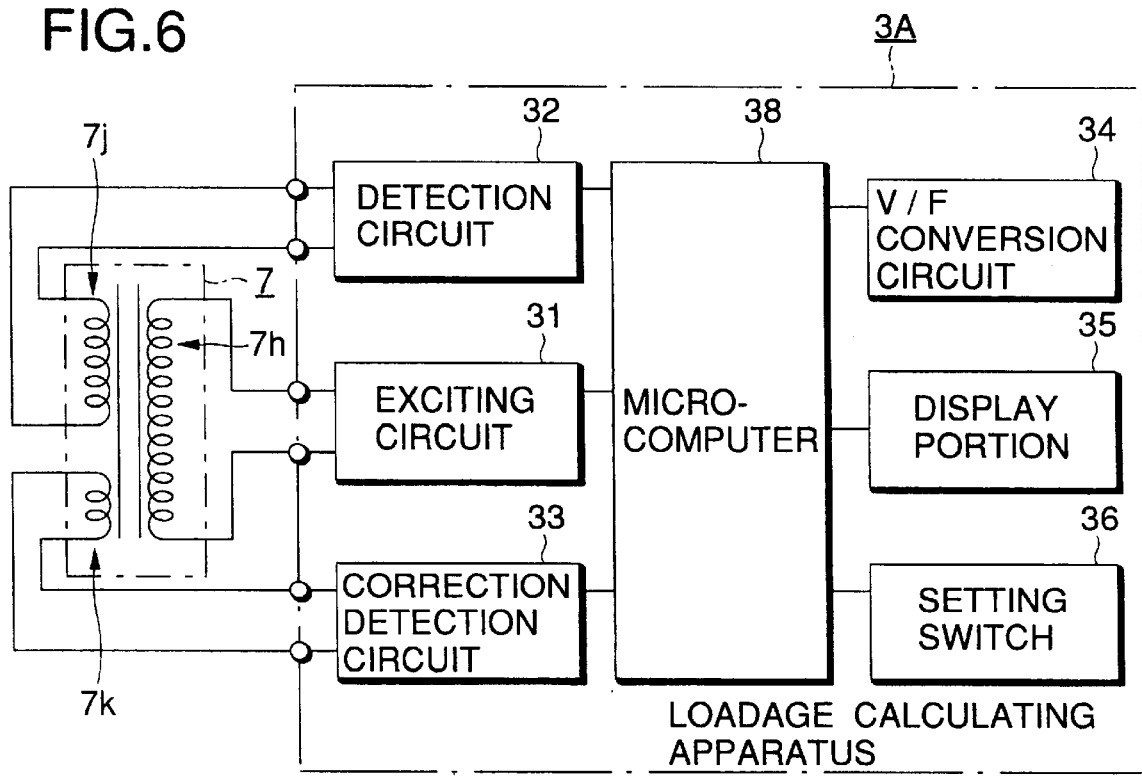
FIG. 6 is an explanatory view showing the schematic structure of a load calculating unit to which the sensing device shown in FIG. 2 is connected and structured to include an output correction apparatus according to the second embodiment.

A load calculating unit 3A of the second embodiment shown in FIG. 6, similarly to the load calculating unit 3 according to the first embodiment, comprises an exciting circuit 31, a detection circuit 32, a correction detection circuit 33, a V/F conversion circuit 34, a display unit 35, a setting switch 36, and a microcomputer 38 which is different from that of the load calculating unit 3 according to the first embodiment.

Figure 7:
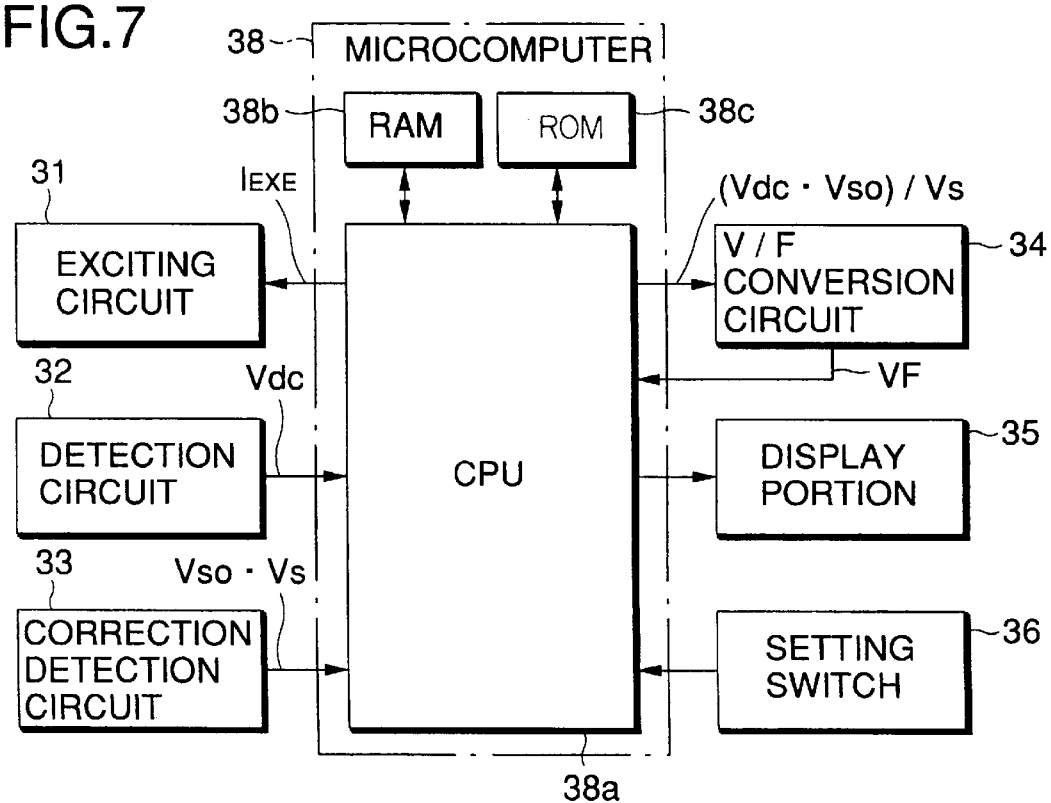
FIG. 7 is a block diagram showing the hardware structure of the microcomputer shown in FIG. 6.

The hardware structure of the microcomputer 38 will now be described with reference to FIG. 7, which is a block diagram.

The microcomputer 38 comprises a CPU 38a, a RAM 38b and a ROM 38c.

The RAM 38b and the ROM 38c are connected to the CPU 38a. Moreover, the detection circuit 32 and the correction detection circuit 33 are connected to the CPU 38a through an A/D converter and an input interface (not shown). In addition, the setting switch 36 is connected to the CPU 38a through the input interface.

Moreover, the exciting circuit 31 and the V/F conversion circuit 34 are connected to the CPU 38a through an output interface and a D/A converter (not shown). In addition, the display unit 35 is connected to the CPU 38a through a driver (not shown).

The RAM 38b has a data area for storing a variety of data items and a work area for performing a variety of operations. The ROM 38c stores a control program for causing the CPU 38a to calculate the load and perform various processes including the displaying process.

The microcomputer 38 calculates the load on the vehicle provided with the sensing device 7 in accordance with the frequency corresponding to the difference in the potential between the two ends of the detection winding 7j of the sensing device 7 output from the V/F conversion circuit 34 and causes the display unit 35 to display the calculated load.

Figure 8:
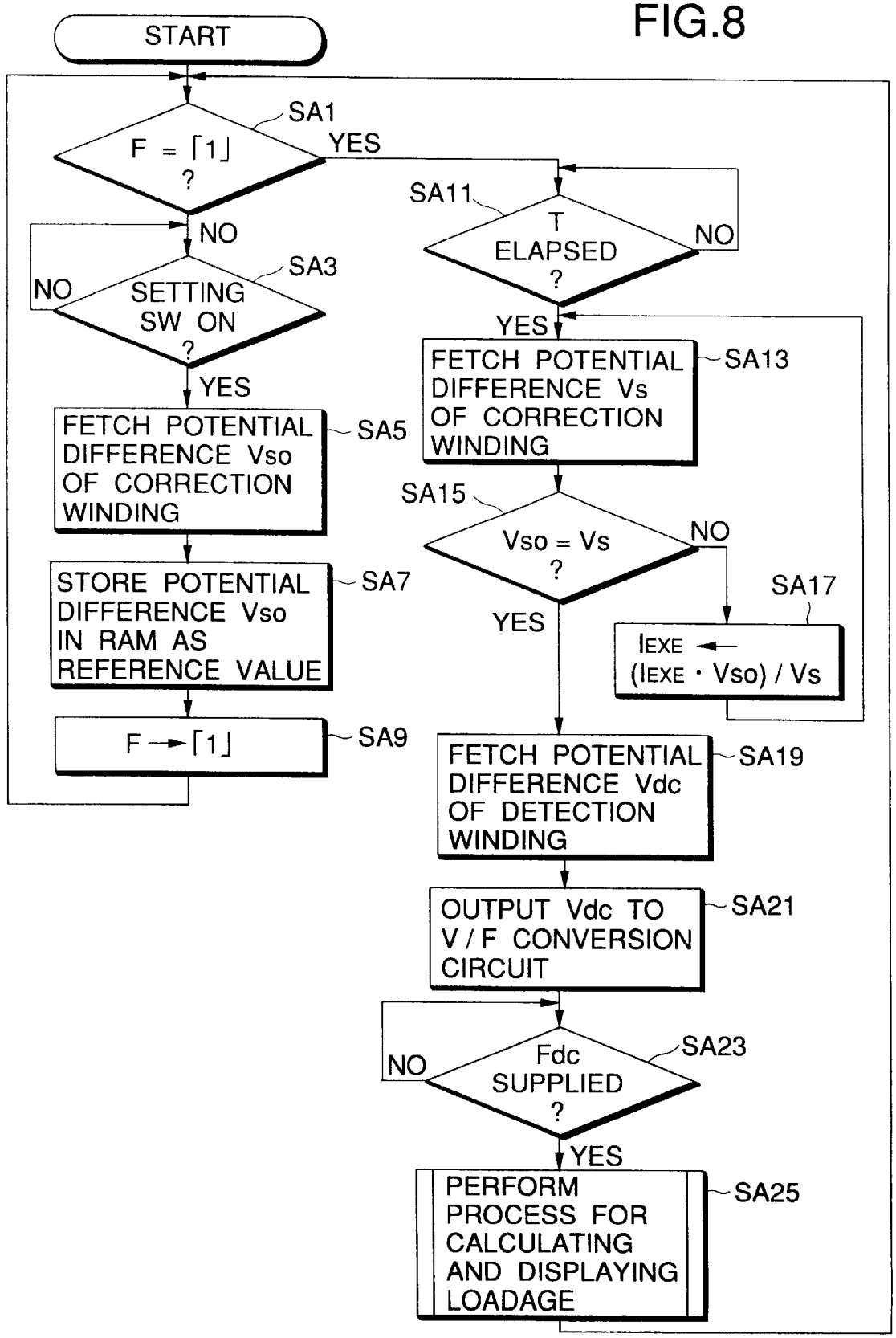
FIG. 8 is a flow chart showing a process for correcting the difference in the potential between the two ends of a detecting winding in accordance with the change in the characteristic of the sensing device among the processes which are performed by the CPU in accordance with a control program stored in the ROM of the microcomputer shown in FIG. 7.
Figure 9:
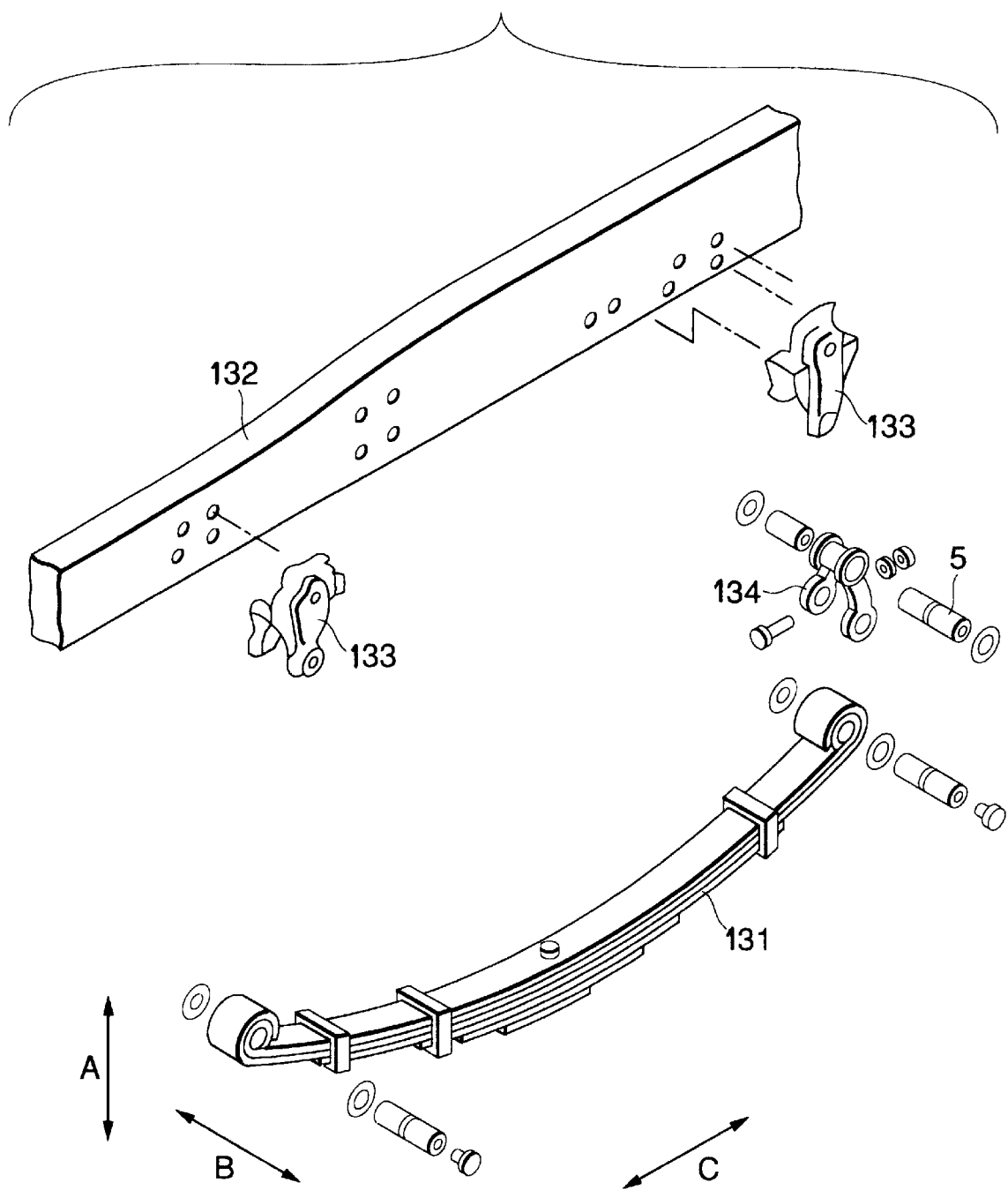
FIG. 9 is an exploded perspective view showing a large-size vehicle, such as a truck, for illustrating positions of the sensing devices for measuring the load according to the present invention.

Among the processes which are performed by the CPU 38a in accordance with the control program stored in the ROM 38c, is a process for correcting the difference in the potential between the two ends of the detection winding 7j in accordance with the change in the characteristic of the sensing device 7, will now be described with reference to a flow chart shown in FIG. 8.

When a power supply switch (not shown) is switched on so that the load calculating unit 3A is supplied with electric power, the microcomputer 38 is turned on, the program is started, the CPU 38a confirms whether or not reference-value set completion flag F in the work area in the RAM 38b is "1" (step SA1). If the flag F is "1" (Y in step SA1), the operation proceeds to step SA11. If the flag F is not "1" (N in step SA1), whether or not the setting switch 36 has been operated is determined (step SA3).

If the setting switch 36 has not been operated (N in step SA3), step SA3 is repeated until it is operated. If the setting switch 36 has been operated (Y in step SA3), the difference in the potential between the two ends of the correction winding 7k of the sensing device 7 detected by the correction detection circuit 33 is fetched after it has been converted into a digital value by the A/D converter (not shown) (step SA5).

The digital value fetched in step SA5 is stored in a reference value storage area of the work area of the RAM 38b as the difference in the potential between the two ends of the correction winding 7k in a state where the characteristic of the sensing device 7 has not been changed from the reference characteristic attributable to the change in the temperature and deterioration with age, that is, reference value Vso (step SA7). Then, the reference-value setting completion flag F in the RAM 38b is set to be "1" (step SA9), and then the operation returns to step SA1.

In step SA11, to which the operation proceeds through (Y) in step SA1 when the reference-value setting completion flag F is "1", whether or not a predetermined sampling period T has elapsed is determined. If it has not elapsed (N), step SA11 is repeated until it elapses. If it has elapsed (Y), the difference in the potential between the two ends of the correction winding 7k of the sensing device 7 detected by the correction detection circuit 33 is converted into digital value Vs by an A/D converter (not shown) and then fetched (step SA13). Then, whether or not the fetched digital value Vs, of the difference in the potential between the two ends of the correction winding 7k, coincides with the reference value Vso stored in the reference value storage area of the RAM 38b is determined (step SA15).

If the digital value Vs fetched in step SA13 coincides with the reference value Vso stored in the RAM 38b (Y in step SA15), the operation proceeds to step SA19. If they do not coincide with each other (N in step SA15), current level $I_{EXE}$, which is at present allowed to flow in the exciting winding 7h of the sensing device 7 by the exciting circuit 31, is changed to value $(I_{EXE} \cdot Vso)/Vs$ obtained by multiplying the current level $I_{EXE}$ by a value obtained by dividing the reference value Vso with the digital value Vs fetched in step SA13 so as to be corrected to correspond to the change in the characteristic of the sensing device 7 (step SA17). Then, the operation returns to step SA13.

In step SA19, the difference in the potential between the two ends of the detection winding 7j of the sensing device 7 detected by the detection circuit 32 is converted into the digital value Vdc by the A/D converter (not shown), and then fetched. The digital value Vdc is output to the V/F conversion circuit 34 (step SA21), and then whether or not frequency Fdc, obtained after V/F conversion of the corrected digital value Vdc, has been supplied from the V/F conversion circuit 34, is determined (step SA23).

If the frequency Fdc has not been supplied (N in step SA23), step SA23 is repeated until it is supplied. If it has been supplied (Y in step SA23), the load calculation and display process is performed such that the load is calculated in accordance with the supplied frequency Fdc and the calculated load is displayed on the display unit 35 (step SA25), and then the operation returns to step SA1.

As described above, the second embodiment has the structure such that the reference value storage means 38ba in the claims is formed by the reference value storage area of the work area of the RAM 38b of the microcomputer 38. The electric current changing means 38A is formed by step SA17 in the flow chart shown in FIG. 8. The reference value acquiring means 38B is formed by steps SA5 and SA7 shown in FIG. 8.

The operation of the sensing device 7 and the load calculating unit 3A having the above-mentioned structures will now be described.

Since the first embodiment and the second embodiment comprise the sensing device 7 having the same structure, the detailed description of the sensing device 7 will be omitted here.

When the load calculating unit 3A and the sensing device 7 are initially used, electric power is supplied to the load calculating unit 3A by switching a power supply switch (not shown) on. Then, in a state where the ambient temperature of the sensing device 7 and the vehicle provided with the sensing device 7 is maintained at a level at which the characteristic of the sensing device 7 is not changed attributable to the temperature, the setting switch 36 is operated. The digital value of the difference in the potential between the two ends of the correction winding 7k detected by the correction detection circuit 33 at this time is stored in the RAM 38b of the microcomputer 38 as the reference value Vso. The reference value Vso is continuously stored in the RAM 38b regardless of the switching operation of the power supply switch.

After the reference value Vso has been stored in the RAM 38b of the microcomputer 38, the load is calculated by the microcomputer 38 such that whether or not the digital value Vs of the difference in the potential between the two ends of the correction winding 7k detected by the correction detection circuit 33 and fetched by the microcomputer 38 coincides with the reference value Vso stored in the RAM 38b is determined.

If they do not coincide with each other, the digital value Vs of the difference in the potential between the two ends of the correction winding 7k is, by the microcomputer 38, made to coincide with the reference value Vso by changing the level of the electric current, which is supplied to the exciting winding 7h of the sensing device 7 by the exciting circuit 31, from the present current level $I_{EXE}$ to the current level $(I_{EXE} \cdot Vso)/Vs$ obtained by multiplying the current level $I_{EXE}$ by the value Vso/Vs obtained by dividing the reference value Vso by the digital value Vs of the difference in the potential between the two ends of the correction winding 7k. Then, the difference in the potential between the two ends of the correction winding 7k detected by the correction detection circuit 33 is fetched by the microcomputer 38 as the digital value Vs. Then, whether or not the digital value Vs coincides with the reference value Vso stored in the RAM 38b is again determined.

If the digital value Vs fetched by the microcomputer 38 coincides with the reference value Vso stored in the RAM 38b, the digital value Vdc of the difference in the potential between the two ends of the detection winding 7j detected by the detection circuit 32 and fetched by the microcomputer 37 is converted into frequency VF=α(Vdc·Vs) by multiplying conversion ratio α by the V/F conversion circuit 34 output. Then, the microcomputer 38 subtracts the frequency corresponding to the offset from the frequency VF=α(Vdc·Vs) and then uses a predetermined weight conversion equation or the like so that the load is calculated and displayed on the display unit 35.

During a period in which electric power is supplied to the load calculating unit 3, for example during a vehicle stop, the calculation of the load is repeated by the above-mentioned operation at every predetermined sampling period T. Thus, display on the display unit 35 is updated.

Also the second embodiment having the above-mentioned structure attains an effect similar to that obtainable from the first embodiment.

The first and second embodiments may be modified to omit the structure in which when the load calculating unit 3 or 3A and the sensing device 7 are initially used, the setting switch 36 is operated in a state where the ambient temperature of the sensing device 7 and the vehicle provided with the sensing device 7 is maintained at a level at which the characteristic of the sensing device 7 is not changed by the temperature so that the digital value of the difference in the potential between the two ends of the correction winding 7k detected by the correction detection circuit 33 and fetched by the microcomputer 37 or 38 is stored in the RAM 38b as the reference value Vso.

However, if the above-mentioned structure is used, it is convenient because the storage of the reference value Vso in the RAM 38b can automatically be performed without the necessity of performing a previous storage operation.

Although the first embodiment has been described for the structure in which the value Vso/Vs, obtained by dividing the reference value Vso by the digital value Vs of the difference in the potential between the two ends of the correction winding 7k detected by the correction detection circuit 33 and fetched by the microcomputer 37, is used to correct the digital value Vdc of the difference in the potential between the two ends of the detection winding 7j, another structure may be employed in which the frequency obtained by converting the digital value Vdc in the V/F conversion circuit 34 is, in place of the digital value Vdc, corrected by the above-mentioned value Vso/Vs.

Although the first and second embodiments, as shown in FIG. 2, have the structure in which the sensing device 7 formed by winding the correction winding 7k between the two through holes 7f of the plate-like member 7a similar to the exciting winding 7h, is employed, another sensing device, different from that shown in FIG. 2, and having a winding which is capable of detecting only change in the electric current occurring due to change in the characteristic of the sensing device among electric currents which flow in the detection winding 7j may, of course, be employed even if the sensing device has a different structure.

As described above, a sensing device of the first aspect of the present invention is arranged to have an exciting winding wound around a magnetic core made of a magnetic material so as to be supplied with electric power, and a detecting winding wound around the magnetic core in such a manner that the detecting winding intersects the exciting winding and generates a detection signal having a level corresponding to a load applied to the magnetic core, in which the sensing device comprises a correction winding wound around the magnetic core in the same direction as a direction in which the exciting winding is wound around the magnetic core.

Therefore, when the exciting winding is supplied with electric power, magnetic flux is generated adjacent to the exciting winding, thus causing a correction signal having a level corresponding to the level of the electric current, which flows in the exciting winding, to be generated in the correction winding. The level of the correction signal is changed to correspond to the change in the characteristic of the sensing device attributable to the change in ambient temperature of the sensing device and the deterioration of the sensing device with age.

Thus, the change in the level of the correction signal generated in the correction winding enables the change of the characteristic of the sensing device and the degree of the change to be detected.

An output correction method for a sensing device of the second aspect of the present invention is arranged such that the level of the detection signal is corrected to correspond to a change in the characteristics of the sensing device of the first aspect, in which the level of a correction signal, which is to be generated in the correction winding owning to magnetic flux generated when electric power is supplied to the exciting winding in a reference characteristic state of the sensing device, is made a reference value; and the level of the detection signal is corrected in accordance with the ratio of the reference value and an actual level of the correction signal.

An apparatus for correcting an output from a sensing device according to the fourth aspect of the invention is arranged such that the level of the detection signal is corrected in accordance with a change in the characteristics of the sensing device of the first aspect, and the apparatus comprises: detection signal level detection means for detecting the level of the detection signal; correction signal level detection means for correcting the level of a correction signal which is generated in the correction winding owning to the magnetic flux generated when electric power is supplied to the exciting winding; reference value storage means for storing the reference value of the correction signal corresponding to the level of the electric current supplied to the exciting winding; and detection signal level correction means for correcting the level of the detection signal detected by the detection signal level detection means, wherein the detection signal level correction means corrects the level of the detection signal detected by the detection signal level detection means in accordance with the ratio of the level of the correction signal detected by the correction signal level detection means and the reference value stored by the reference value storage means.

Therefore, the ratio of the reference value of the correction signal and the actual level corresponds to the ratio of the change of the actual level of the detection signal from the original level of the detection signal in the reference characteristic state of the sensing device. Therefore, correction of the actual level of the detection signal, with the ratio of the reference value of the correction signal and the actual level, enables the level of the detection signal to be restored to the original level. Thus, an accurate load can be calculated.

A method of correcting an output from a sensing device of the third aspect of the invention is arranged such that the level of the detection signal is corrected in accordance with change in the characteristics of the sensing device of the first aspect, and the output correction method comprises the steps of: making, to be a reference value, the level of a correction signal which is generated in the correction winding owning to magnetic flux which is generated when electric power is supplied to the exciting winding in a reference characteristic state of the sensing device; and changing the level of an electric current which is supplied to the exciting winding in accordance with the ratio of the reference value and the actual level of the correction signal.

An apparatus for correcting an output from a sensing device according to the fifth aspect of the invention is arranged such that the level of the detection signal is corrected in accordance with change in the characteristics of the sensing device of the first aspect, and the apparatus comprises: detection signal level detection means for detecting the level of the detection signal; correction signal level detection means for correcting the level of a correction signal which is generated in the correction winding owning to the magnetic flux generated when electric power is supplied to the exciting winding; reference value storage means for storing the reference value of the correction signal corresponding to the level of the electric current supplied to the exciting winding; and exciting current changing means for changing the level of the electric current which is supplied to the exciting winding, wherein the exciting current changing means changes the level of the electric current supplied to the exciting winding in accordance with the ratio of the level of the correction signal detected by the correction signal level detection means and the reference value stored by the reference value storage means.

The ratio of the reference value of the correction signal and the actual level is used to change the level of the electric current supplied to the exciting winding. Thus, the actual level of the correction signal is changed by a degree corresponding to the change from the original level of the detection signal in the reference characteristic state of the sensing device, so that the level of the detection signal is restored to the original level and thus an accurate load is calculated.

An apparatus for correcting an output from a sensing device according to the sixth aspect of the invention further comprises: reference value acquiring means for causing the reference value storage means to store, as the reference value, the level of the correction signal detected by the correction signal level detection means when the sensing device is initially operated.

Therefore, the reference value acquiring means acquires the reference value stored in the reference value storage means so that the necessity for the reference value storage means to previously store the reference value is eliminated. Thus, the reference value can automatically be stored by the reference value storage means.

What is claimed is:

1. A sensing device, comprising:

a magnetic core made of a magnetic material;

an exciting winding wound around said magnetic core;

a detecting winding wound around said magnetic core so as to intersect said exciting winding, said exciting winding being supplied with electric power so that said detecting winding generates a detection signal having a level corresponding to a load applied to said magnetic core; and a correction winding wound around said magnetic core in the same direction as a direction in which said exciting winding is wound around said magnetic core, said correction winding provided for generating a correction signal.

2. A method of correcting a detection signal from a sensing device having a magnetic core, an exciting winding wound around said magnetic core and having ends connected to an electric source, a detecting winding wound around said magnetic core and generating said detection signal, and a correction winding wound around said magnetic core for generating a correction signal, wherein the level of said detection signal is corrected in accordance with changes in characteristics of said sensing device, said correction method comprising the steps of:

making a reference value of a level of said correction signal generated in said correction winding due to magnetic flux generated when electric power is supplied to said exciting winding in a reference characteristic state of said sensing device; and correcting the level of said detection signal in accordance with a ratio of said reference value and an actual level of said correction signal.

3. A method of correcting a detection signal from a sensing device having a magnetic core, an exciting winding wound around said magnetic core and having ends connected to an electric source, a detecting winding wound around said magnetic core and generating said detection signal, and a correction winding wound around said magnetic core for generating a correction signal, wherein the level of said detection signal is corrected in accordance with changes in characteristics of said sensing device, said correction method comprising the steps of:

making a reference value of a level of said correction signal generated in said correction winding due to magnetic flux generated when electric power is supplied to said exciting winding in a reference characteristic state of said sensing device; and changing a level of an electric current which is supplied to said exciting winding in accordance with a ratio of said reference value and an actual level of said correction signal.

4. An apparatus for correcting a detection signal from a sensing device such that the level of said detection signal is corrected in accordance with changes in characteristics of said sensing device, said sensing device comprising a magnetic core, an exciting winding wound around said magnetic core and having ends connected to an electric source, a detecting winding wound around said magnetic core for generating said detection signal, and a correction winding wound around said magnetic core for generating a correction signal, said apparatus comprising:

- detection signal level detection means for detecting a level of said detection signal;
- correction signal level detection means for detecting a level of said correction signal generated in said correction winding due to the magnetic flux generated when electric power is supplied to said exciting winding;
- reference value storage means for storing a reference value for said correction signal corresponding to a level of an electric current supplied to said exciting winding; and
- detection signal level correction means for correcting the level of said detection signal detected by said detection signal level detection means, wherein
- said detection signal level correction means corrects the level of said detection signal detected by said detection signal level detection means in accordance with a ratio of the level of said correction signal detected by said correction signal level detection means and said reference value stored by said reference value storage means.

5. An apparatus for correcting a detection signal from a sensing device such that the level of said detection signal is corrected in accordance with changes in characteristics of said sensing device, said sensing device comprising a magnetic core, an exciting winding wound around said magnetic core and having ends connected to an electric source, a detecting winding wound around said magnetic core for generating said detection signal, and a correction winding wound around said magnetic core for generating a correction signal, said apparatus comprising:

- detection signal level detection means for detecting a level of said detection signal;
- correction signal level detection means for detecting a level of said correction signal generated in said correction winding due to the magnetic flux generated when electric power is supplied to said exciting winding;
- reference value storage means for storing a reference value for said correction signal corresponding to a level of an electric current supplied to said exciting winding; and
- exciting current changing means for changing the level of the electric current which is supplied to said exciting winding, wherein
- said exciting current changing means changes the level of the electric current supplied to said exciting winding in accordance with a ratio of the level of said correction signal detected by said correction signal level detection means and said reference value stored by said reference value storage means.

6. An apparatus as claimed in claim 4, further comprising:
reference value acquiring means for causing said reference value storage means to store, as said reference value, the level of said correction signal detected by said correction signal level detection means when said sensing device is initially operated.

7. An apparatus as claimed in claim 5, further comprising:
reference value acquiring means for causing said reference value storage means to store, as said reference value, the level of said correction signal detected by said correction signal level detection means when said sensing device is initially operated.

8. A sensing device as claimed in claim 1, wherein said correction winding is wound around said magnetic core in the same direction and adjacent to said exciting winding.

9. A sensing device as claimed in claim 8, wherein:
- said exciting winding is wound around said magnetic core through two opposing through holes; and
- said correction winding is wound around said magnetic core also through said two opposing through holes.

* * * * *